(12) United States Patent
Jähnig et al.

(10) Patent No.: US 8,622,011 B2
(45) Date of Patent: Jan. 7, 2014

(54) FLOATING FOUNDATION SUPPORTING FRAMEWORK WITH BUOYANCY COMPONENTS, HAVING AN OPEN-RELIEF DESIGN

(75) Inventors: Jens Jähnig, Dorfhain (DE); Frank Dahlhaus, Linkenheim-Hochstetten (DE)

(73) Assignee: Gicon Windpower IP GmbH, Dresden (DE)

(*) Notice: Subject to any disclaimer, the term of this patent is extended or adjusted under 35 U.S.C. 154(b) by 161 days.

(21) Appl. No.: 12/991,085

(22) PCT Filed: Jan. 8, 2009

(86) PCT No.: PCT/EP2009/050186
§ 371 (c)(1),
(2), (4) Date: Mar. 9, 2011

(87) PCT Pub. No.: WO2009/087200
PCT Pub. Date: Jul. 16, 2009

(65) Prior Publication Data
US 2011/0155038 A1    Jun. 30, 2011

(30) Foreign Application Priority Data
Jan. 9, 2008  (DE) .......................... 10 2008 003 647

(51) Int. Cl.
*B63B 35/44* (2006.01)
(52) U.S. Cl.
USPC ........................................ 114/267
(58) Field of Classification Search
USPC ................................. 114/258–267
See application file for complete search history.

(56) References Cited

U.S. PATENT DOCUMENTS

| | | | |
|---|---|---|---|
| 3,630,161 A | 12/1971 | Georgii | |
| 5,435,262 A | 7/1995 | Grinius et al. | |
| 7,075,189 B2 * | 7/2006 | Heronemus et al. | 290/44 |
| 7,156,586 B2 * | 1/2007 | Nim | 405/223.1 |
| 8,235,629 B2 * | 8/2012 | Jakubowski | 405/224 |
| 2011/0155038 A1 | 6/2011 | Jähnig et al. | |

FOREIGN PATENT DOCUMENTS

| | | |
|---|---|---|
| DE | 102005036679 | 2/2007 |
| EP | 1288122 | 3/2003 |
| EP | 1876093 | 1/2008 |
| EP | 2229313 B1 | 1/2009 |
| FR | 2008744 | 1/1970 |
| FR | 2818327 | 6/2002 |
| GB | 2378679 | 2/2003 |
| NL | 1008318 | 8/1999 |
| WO | WO 2004055272 | 7/2004 |
| WO | WO 2006038091 | 4/2006 |
| WO | WO 2007096680 | 8/2007 |

OTHER PUBLICATIONS

EPO Office Action dated Mar. 23, 2012 issued in EPT Application 09700379.2.

* cited by examiner

*Primary Examiner* — Daniel V Venne
(74) *Attorney, Agent, or Firm* — Michael Soderman (57) ABSTRACT

The floating foundation supporting framework according to the invention for offshore structures comprises a plurality of buoyancy elements which are arranged on the outside of a bar-type supporting framework which, in turn, is connected to ballast elements via cables (8, 9, 10). This design results in a simple construction and low construction costs.

11 Claims, 9 Drawing Sheets

FLOATING FOUNDATION SUPPORTING FRAMEWORK WITH BUOYANCY COMPONENTS, HAVING AN OPEN-RELIEF DESIGN

CROSS REFERENCE TO RELATED APPLICATIONS

This application is the U.S. national stage of International Application No. PCT/EP2009/050186, filed on Jan. 8, 2009, and claims the benefit thereof. The international application claims the benefits of German Application No. 10 2008 003 647.1 filed on Jan. 9, 2008; all applications are incorporated by reference herein in their entirety.

BACKGROUND

The invention relates to a floating foundation supporting framework for offshore structures for positioning functional units in a floating position. Such floating foundation supporting frameworks may hold and support off-shore wind power plants, light towers, transmitter and/or receiver plants, radar plants, bridges, jetties, landing strips or the like, near a coast-line or also at a greater distance from a coast-line.

Floating foundations have been known, for example, for light towers or also for wind power plants. Regarding this, reference is made to DE 10 2005 036 679.1, which relates to anchorages of floating foundations on the ocean floor.

Large plants such as medium-performance and high-performance wind power plants frequently have considerable weight that needs to be compensated by appropriate floating bodies. These must generate buoyancy forces that must far exceed the weight of the structure to be supported as well as that of the floating foundation in order to thus hold the affected structure still, irrespective of wave action and wind influence. To accomplish this, the necessary buoyancy forces may add up to several thousand tons. Frequently, floating foundations must necessarily span a relatively large area. The buoyancy forces applied to individual points by the buoyancy elements must be safely absorbed and tolerated by the building structure.

In addition to the requirements regarding the stability of the foundation under load, there are requirements regarding the manufacturing options and costs affecting an appropriate building construction in practical applications. For example, the logistics as well as the construction efforts, material expenses and, finally also maintenance expenses, should be kept within limits. Until now, floating foundation structures have displayed deficits regarding at least one of the mentioned aspects.

Considering this, it is the object of the invention to provide a floating foundation supporting framework that has been improved with regard to at least one of the mentioned aspects when compared with known building structures.

A floating foundation having a supporting framework in accordance with an aspect of the invention achieves this object.

DETAILED DESCRIPTION

The supporting framework comprises buoyancy elements, at least one of which is at least partially made of concrete, and connecting elements, which are made of steel and which form a supporting framework. By making the buoyancy elements at least partially of concrete, it is possible to considerably lower the manufacturing costs.

This applies, in particular, to geometrically complex shapes such as, for example, the junction regions that must be designed to be hollow in order to make walking on the structure possible. This also applies to buoyancy elements that are located at the outer ends of a supporting framework that is star-shaped, for example, in order to introduce buoyancy forces into the supporting framework at that location. In particular, the lower parts or bottoms of buoyancy elements may be made of concrete. Due to the rigidity of reinforced concrete elements, such elements may have a flat bottom or a bottom that is only slightly arched, for example.

The use of concrete for the manufacture of a floating foundation supporting framework minimizes the use of steel and thus reduces corrosion problems and prime costs.

Preferably, the floating foundation supporting framework comprises several cantilevers that extend horizontally when in use, as well as junction points (joints) from which extend inclined and horizontal pipe segments. The supporting framework is comprised of a load-transferring spatial trussed structure, preferably configured as prefabricated steel structures and, e.g., as hollow elements generating buoyancy forces in the junction regions.

These structures preferably have the form of reinforced concrete components and are made of, for example, water-impermeable concrete. The junction regions are preferably designed so as to be hollow and patent in order to ensure that it is possible to walk on the cantilever regions. Preferably, the supporting framework is designed in such a manner that the buoyancy forces and the load-transfer in the junction points (joints) of the pipe segments are uncoupled in the entire cantilever region and in the connecting region of the buoyancy elements, said buoyancy elements preferably being arranged on the extreme outside, and are associated with the specific supporting framework elements, respectively. As a result of this, clear load conditions are established and undesirable double loads or overloads are prevented.

The supporting framework in accordance with the invention is erected in mixed construction with the use of steel and concrete, preferably water-impermeable concrete. The framework is designed in part as a shell supporting framework and in part as a supporting bar framework. For example, the shell supporting framework comprises pipe segments made of steel or also of reinforced concrete components that are designed, for example, as junction points (joints). The supporting bar framework comprises trussed structure sections, for example, made of steel piping or other steel profiles. The supporting bar framework is connected to the shell supporting framework, so that the shell supporting framework and the supporting bar framework, together, form the foundation supporting framework.

The overall supporting behavior is defined, in the junction points (joints) of the supporting framework and in the cantilevers, by the trussed construction. The buoyancy forces due to locally applied loads occur at the junctions and on the cantilevers due to reinforced concrete components or, in the cantilever regions, also due to pipe segments.

Preferably, the outlying buoyancy elements are upright cylinders whose lower cup is configured as a circular cylindrical shell. A steel shell structure is set on said circular cylindrical shell, said steel shell structure preferably being manufactured as a prefabricated cup-shaped circular cylindrical shell that is open in downward direction.

At the junction points (joints), the reinforced concrete components are connected to the steel structures. To do so, preferably, water-impermeable, corrosion-resistant assembly techniques are employed. Steel pipes or steel socket ends can be fitted to hollow concrete elements by means of elastomer elements or the like.

The design of the supporting framework in mixed construction comprising shell supporting frameworks and supporting bar frameworks allows a high degree of variability regarding the requirements for the inert mass distribution in the total system. In addition, it is possible to adapt the system requirements to wind power plants designed for six megawatts and above. In addition, the modules of the system such as, for example, the components of the trussed structure and the components of the shell supporting structure may be prefabricated. The plant may be erected in the dry dock or also on site. For example, assembled system modules may undergo final assembly in the dry dock, whereupon the foundation supporting framework is towed to the installation site. As a result of the prefabrication of the modules, it is only necessary to perform the final assembly in the dry dock. This minimizes the required dwell time in the dry dock and thus permits the efficient production of a larger number of floating supporting frameworks.

Preferably, the load introduction of the lower guy occurs in trussed construction. Preferably, this is at the ends of the cantilevers without any load being applied to the buoyancy elements. Consequently, the supporting framework absorbs the forces of the guy as well as the forces of the buoyancy elements. However, it is also possible to impart the pulling forces of the guy as well as the force of the weight of the structure, respectively, as pressure (completely) into the concrete cups (see FIG. 7).

With the foundation supporting framework presented herein, it is possible to erect—in a cost-neutral manner—building structures in depths of up to one thousand meters, irrespective of the depth of the water.

The system in accordance with the invention enables an optimal adaptation of the system mass distribution over variably designed ballast elements, preferably by arranging additional masses in the form of prefabricated components of reinforced concrete. These components may be arranged, as needed, at various locations of the entire trussed structure of the cantilevers. Such masses may also be disposed to increase mass inertia, avoid vibrations, attenuate vibrations, reduce vibrations and the like.

Optimally, the total buoyancy force may be adapted to various requirements by additionally providing variably designed buoyancy components, preferably in the form of spherical hollow bodies, in the entire region of the trussed structure of the cantilevers.

BRIEF DESCRIPTION OF THE DRAWINGS

Additional details of advantageous embodiments of the invention are the subject matter of the drawings, the description or the claims. The description is restricted to essential aspects of the invention and other situations. The drawings disclose additional details and are to be used for supplementary reference. They show in FIG. 1 an isometric view of an embodiment of a floating foundation, in schematic representation, using the example of a wind power plant;

DETAILED DESCRIPTION OF THE PREFERRED EMBODIMENT

Figure 1:
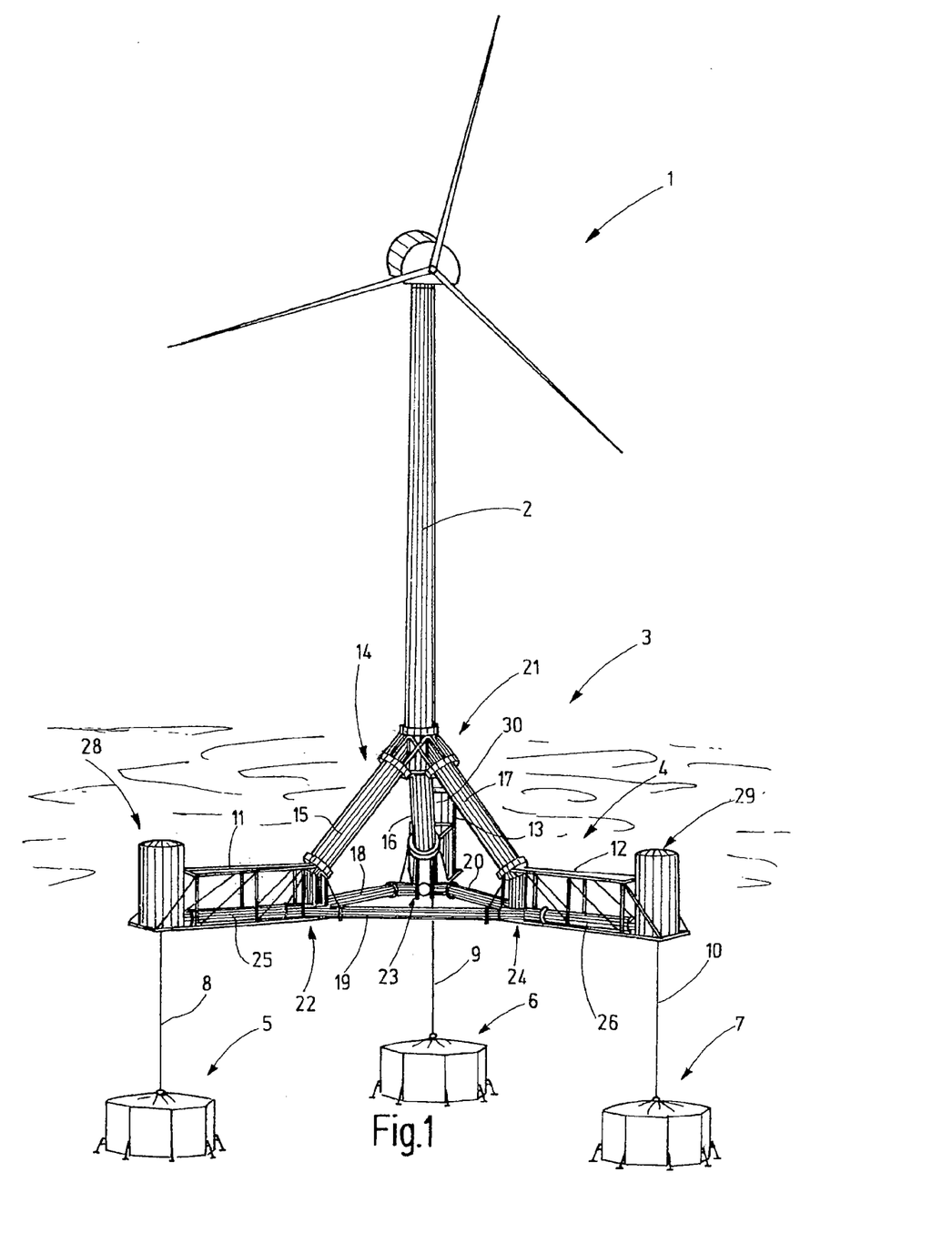

FIG. 1 shows a wind power plant 1 that has been erected in the ocean and that comprises a mast 2 seated on a floating foundation 3. The floating foundation 3 comprises a floating foundation supporting framework 4 that is held on ballast elements 5, 6, 7. The latter are seated on the ocean floor and are made of concrete. They are connected to the foundation supporting framework 4 by means of cables 8, 9, 10 that are made of corrosion-resistant or corrosion-protected steel. The weight of the ballast elements 5, 6, 7 is high enough so as to by far exceed the forces produced by the foundation supporting framework 4.

Figure 2:
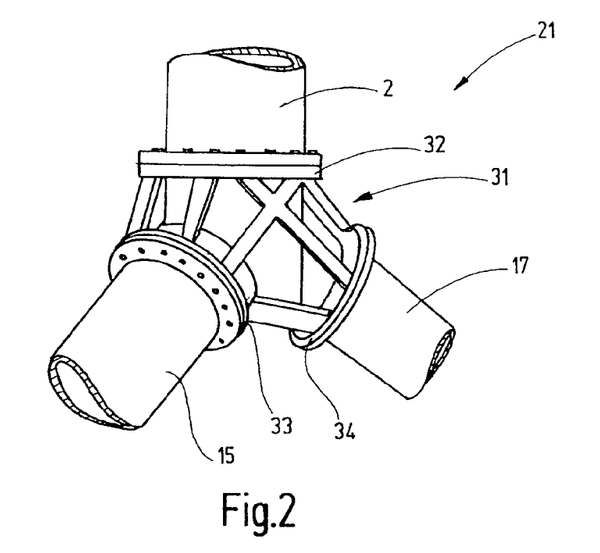
FIG. 2 a separate view of one of the junction points (joints) of the foundation supporting framework.

The foundation supporting framework 4 is a mixed steel and concrete structure. This structure comprises several cantilevers 11, 12, 13 that extend radially outward from a central spatial trussed structure 14, for example in the form of a tetrahedron. Considering several aspects, the foundation supporting framework 14 is designed in mixed construction. The framework is designed, in part, as a shell supporting framework and in part as a supporting bar framework. In addition, the framework includes steel elements as well as concrete elements. The spatial trussed structure 14 comprises pipe segments 15, 16, 18, 19, 20 that form the sides of a tetrahedron and are connected to each other at strut attachment fittings 21, 22, 23, 24. The relatively large diameter of the pipe segments 15 through 20 makes it possible that each pipe may be viewed as a shell supporting framework. The strut attachment fittings 21 through 24 are hollow and lead to additional pipe segments 25, 26 that preferably extend approximately horizontally and radially away from the center of the foundation supporting framework 4 in outward direction toward the buoyancy elements 28, 29, 30. Preferably, the strut attachment fittings 21 through 24 are made of reinforced concrete, however, they may also be made of steel piping. In particular, this applies to the strut attachment fitting 21. The fittings are connected to the respectively adjacent pipe segments 15 through 20 and 25, 26 by means of salt-water-resistant, corrosion-resistant and tight junctions. The strut attachment fittings 21 through 24 are largely load-free. However, their presence contributes to the total buoyancy of the building structure. They are surrounded by a cage-like bar framework. This is evident from FIG. 1 and from the example of the strut attachment fitting 21, in particular, also from FIG. 2. Such a cage 31 forms a spatial bar framework that connects ring-shaped, load-distributing hollow box girders 32, 33, 34 with each other, whereby appropriate pipe segments 15, 17 or also the mast 2 may be connected to said girders. The ring-shaped hollow box girder 32, 33 may have a circular or a rectangular cross-section and ground plan. Due to the rectangular shape of the girder, the attachment of the spatial trussed structure of the cantilever is simple from a technological viewpoint and is more favorable from a statics viewpoint. The rods forming the cage 31 may be solid profiles, pipe profiles, L-profiles, T-profiles or other suitable profiles. Preferably, the cage 31 is a welded construction.

Figure 4:
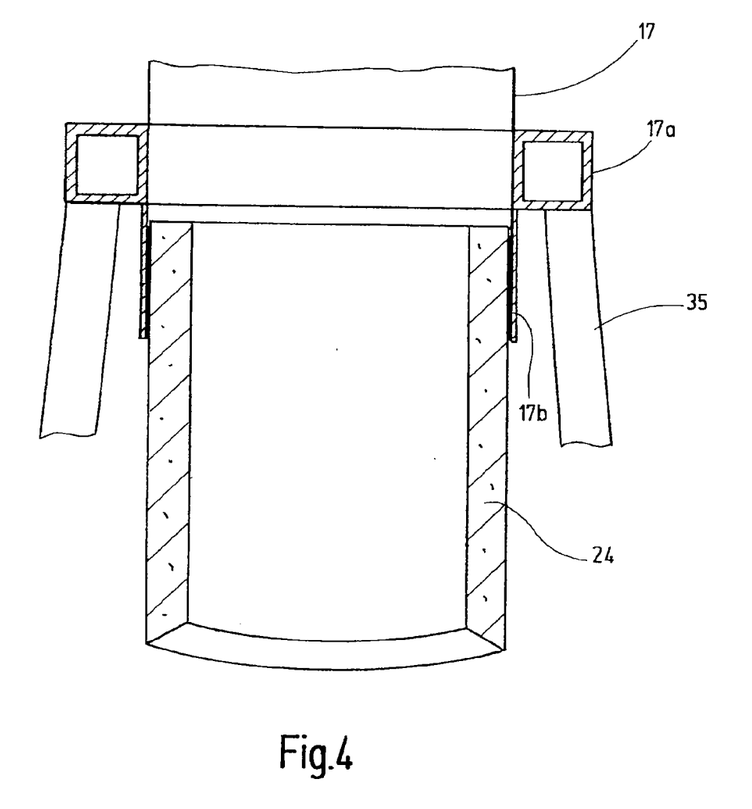
FIG. 4 a sectional view of a detail of a connecting point between a concrete element and a steel element at a junction.

FIG. 4 shows a hollow box girder using the strut attachment fitting 24 as the example. The bar framework 35 adjoins the (rectangular-) ring-shaped box profile 17a, said profile adjoining the pipe segment 17. In addition, the (rectangular-) ring-shaped box profile 17a may be fitted to a socket end 17b in which the strut attachment fitting 24 may be placed while creating a seal.

Figure 5:
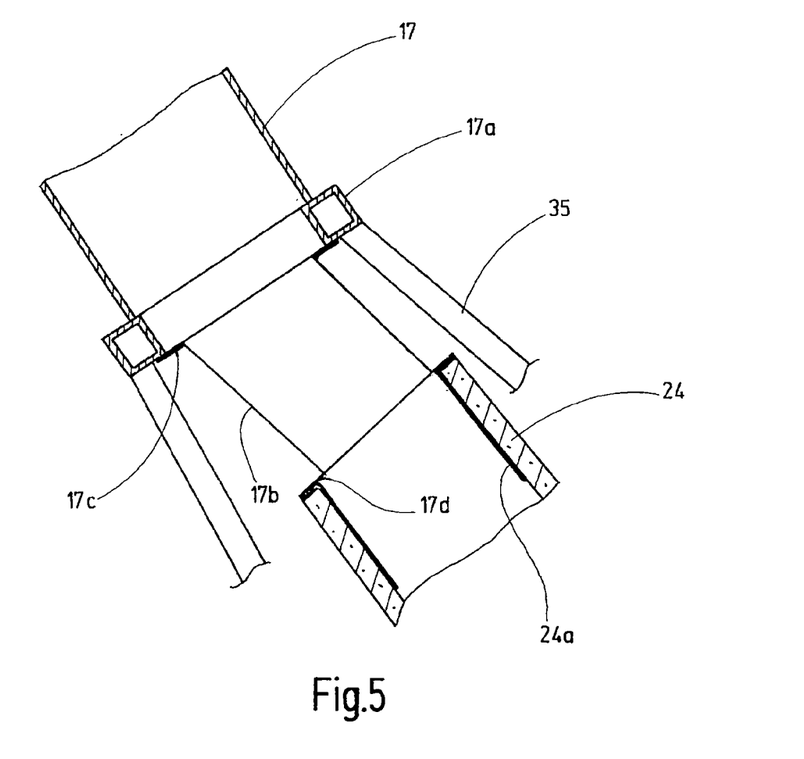
FIG. 5 a detail of a sectional view of an alternative embodiment of a connecting point between a concrete element and a steel element at a junction.

FIG. 5 also shows a modified embodiment of the connection with the use of the strut attachment fitting 24 as the example. A short metal pipe piece 17b is provided between the box profile 17a and the strut attachment fitting 24. The metal pipe piece may be attached, on one side or on both sides, to the box profile 17a and to the strut attachment fitting 24 by means of pliable flanges 17c. Preferably, the strut attachment fitting 24 has an internal permanent formwork 24a made of sheet metal, e.g., steel sheeting, said formwork lining the concrete element of the strut attachment fitting 24. The formwork 24a may extend up to the front end of the strut attachment fitting 24 and be welded there to the flanges 17d or directly to the socket end 17b, or be attached there in another manner.

Figure 3:
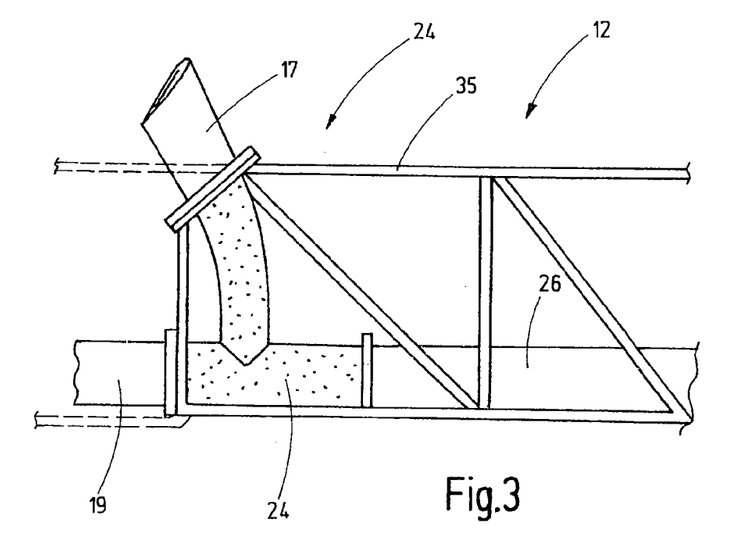
FIG. 3 a side view of a detail of a cantilever of the foundation supporting framework.

Preferably, each of the cantilevers 11, 12, 13 is configured as a spatial supporting bar framework. This can be seen in FIG. 1 and, by referring to the example of the cantilever 12, also in FIG. 3. As can be seen, the bar framework 35 of the cantilever 12 can circumscribe the strut attachment fitting 24 and thus reduce the load applied thereto. The bar framework 35 thus creates the cage enclosing the strut attachment fitting 24; the fitting is made of reinforced concrete. Again, hollow box girders or other flanges are provided for the attachment of the pipe segments 17, 29 26. Again, the seal between the strut attachment fitting 24 and the pipe segments 17, 19, 26 is water-tight and corrosion-resistant, e.g., due to elastomer elements, compression seals or the like. The occurring loads, in particular bending-torsion loads and the like, are absorbed by the bar framework 35 and transferred by said bar framework to the load-bearing pipe segments 17, 19. In the present exemplary embodiment, the pipe segment 26 is arranged in a non-load-bearing manner in the cage formed by the bar framework 35. If necessary, the pipe segment may also be designed as a concrete pipe, plastic pipe or the like.

Preferably, the bar framework 35 forms a spatial trussed structure having a rectangular cross-section. Unlike the depiction in FIG. 1, the bar framework may also continue to extend through the interior space of the spatial trussed structure 14.

Figure 6:
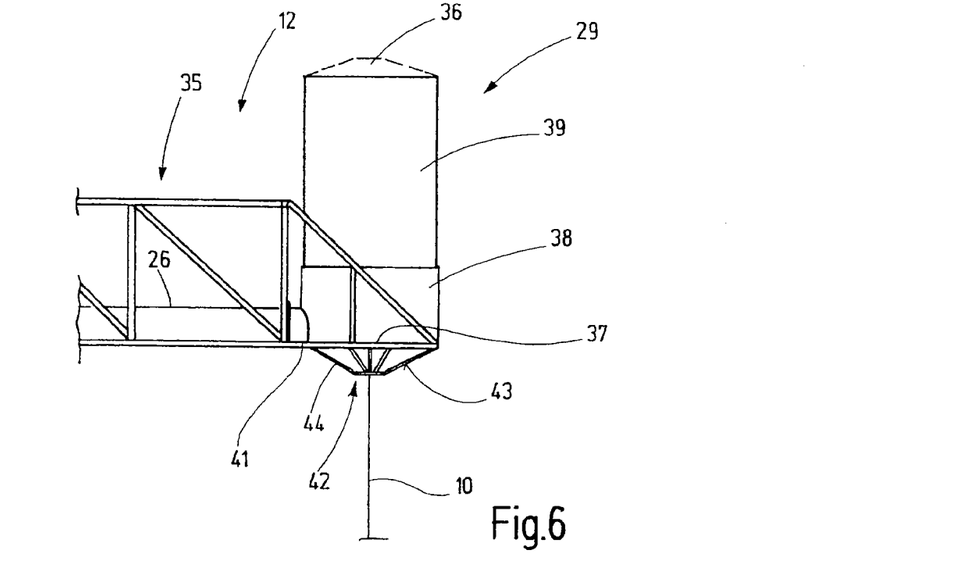
FIG. 6 a schematized side view of an end of the cantilever with floating body.
Figure 9:
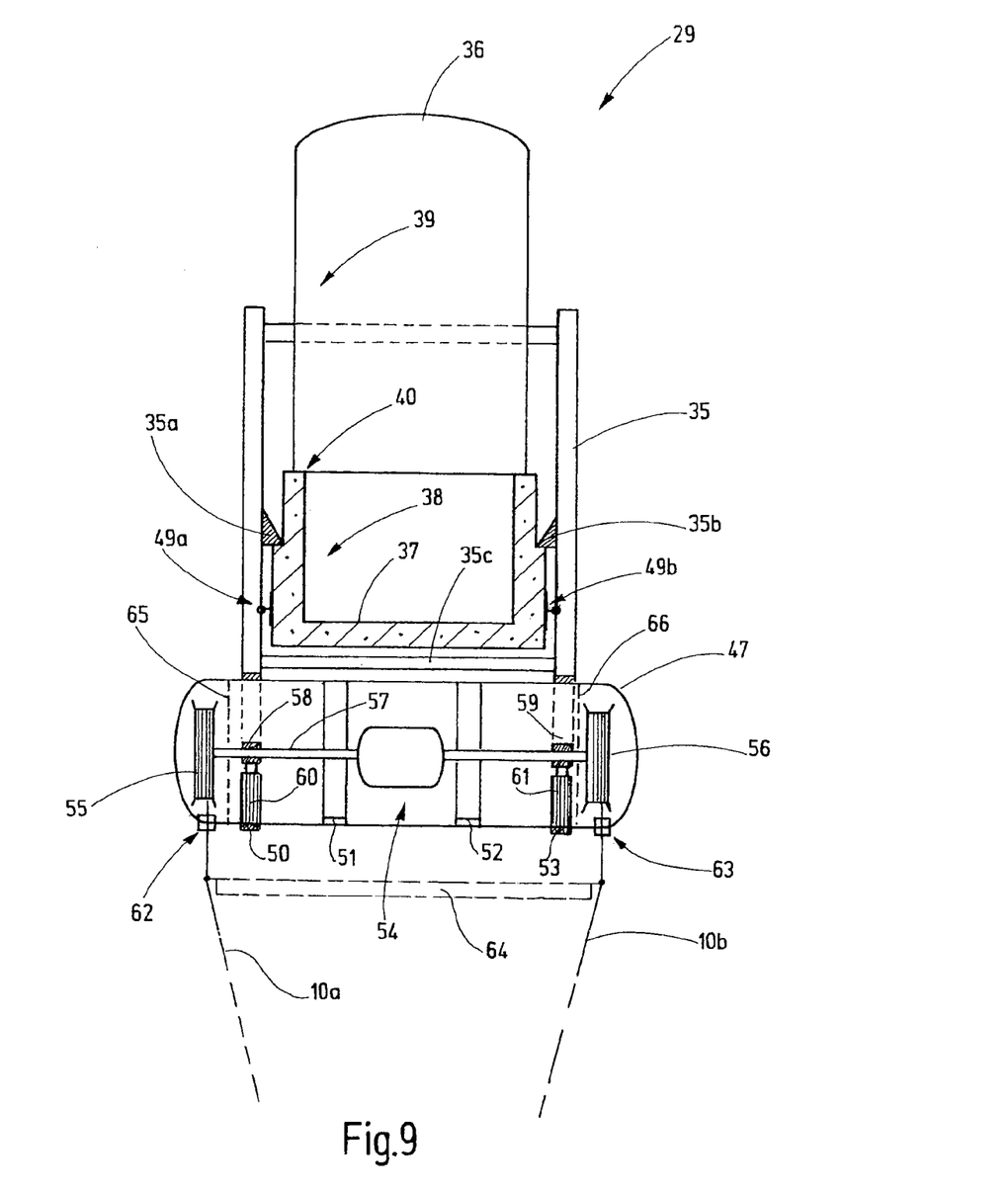
FIG. 9 a schematic representation, in section, of a preferred embodiment of the floating body with sub-level machine room.

FIGS. 6 and 9 show the attachment of the buoyancy element 29 to the cantilever 12, this standing for each of the other radially outwardly located buoyancy elements 28, 30. As can be seen, the buoyancy element 2 9 forms a vertically upright cylinder with a curved or rounded upper side 36 and an essentially flat bottom 37. Preferably, said buoyancy element is comprised of two parts. Preferably, its lower part 38 is comprised of a cup-shaped cylindrical section of reinforced concrete, as is obvious from the sectional view in accordance with FIG. 7 or 9. However, it may have a flat or, as shown, also a slightly conical or otherwise arched bottom. Furthermore, the buoyancy element 29 comprises an upper part 39 that may be, e.g., a steel structure. As is shown by FIG. 5, the upper part 39 and the lower part 38 are connected to each other in a sealed manner. For example, they abut against a seal 40 that is seated on the upper annular flat sealing surface of the lower part 38. They may be screwed together to create a connection. Preferably, however, the part 38 is provided on its inside with a permanent formwork, e.g., of steel, that may extend flange-like over the upper front side of the part 38. This formwork may be welded to the part 39. In this case, the seal 40 is unnecessary.

The buoyancy element 29 is hollow and may be walkable. The pipe segment 26 may be connected to the concrete element 38 by means of a connecting piece 41. Walls, cross-walls or the like may be provided on the connecting piece 41 and/or in or on the pipe segment 26, in which case said walls can be locked if necessary.

The buoyancy element 29 is anchored to the cantilever 12 by means of connecting means. Preferably, these means are arranged on the upper region of part 38 in order to transmit the upthrust buoyancy force acting on part 38 as pressure force to the cantilever 12. Attachment means may be steps provided on the concrete element, anchors set therein, steel plates and the like, these being connected to the cantilever 12. Preferably the steps, as shown by FIG. 9, are directed upward and abut upward against the corbels 35a, 35b of the bar framework 35. Below part 38, the bar framework 35 may have one or more supports 35c, on which the concrete cup 38 may be temporarily set during assembly in the dry dock. Lateral supports 49a, b transmit lateral forces from the bar framework 35 to the buoyancy element 29 and vice versa.

In addition, the cantilever 12 has connecting arrangements 42 for the cable 10. The connecting arrangement 42 imparts the pulling force of the cable 10 into the cantilever 12. To do so, individual struts 43, 44 are provided. The struts extend downward from the cantilever 12 and connect the cantilever to the cable 10.

Figure 7:
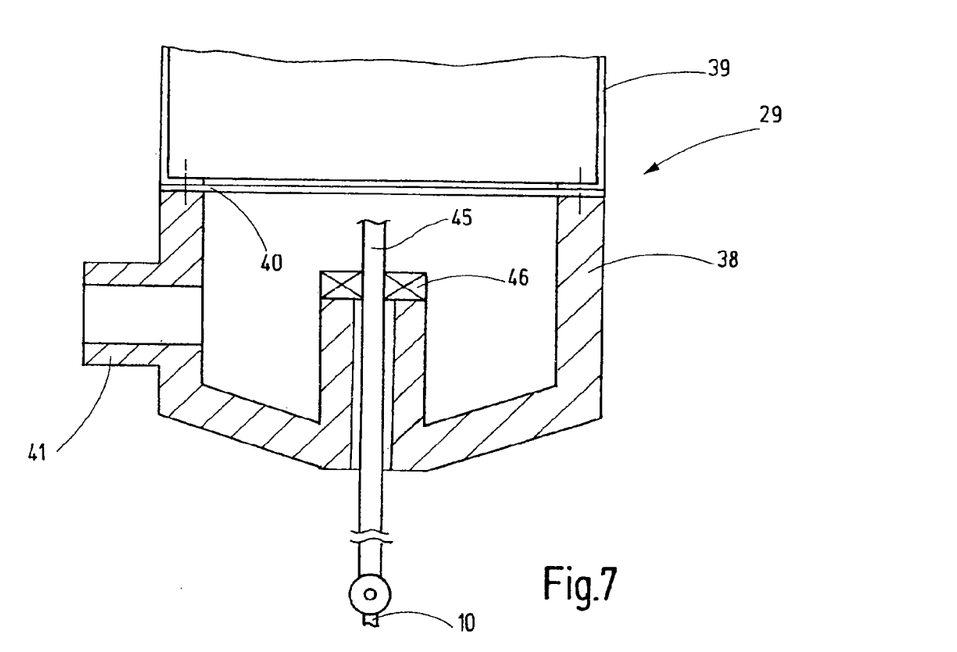
FIG. 7 a depiction, partially in section, of the floating body in accordance with FIG. 6.

It is also possible to provide a leveling arrangement that is, e.g., hydraulically actuated. The arrangement holds a vertically adjustable bar 45, as indicated in FIG. 7. While an appropriate, e.g., hydraulic adjustment arrangement is arranged in the interior space of the buoyancy element 29 and is in contact with one end of the bar 45, its other end may be connected to the cable 10. On the bottom of part 38, an appropriate passage may be provided, said passage enabling a rod 45 to pass, sealing the bar permanently relative to the passage. Also, active leveling of the floating foundation 3 can be accomplished with the hydraulic adjustment arrangement.

Figure 8:
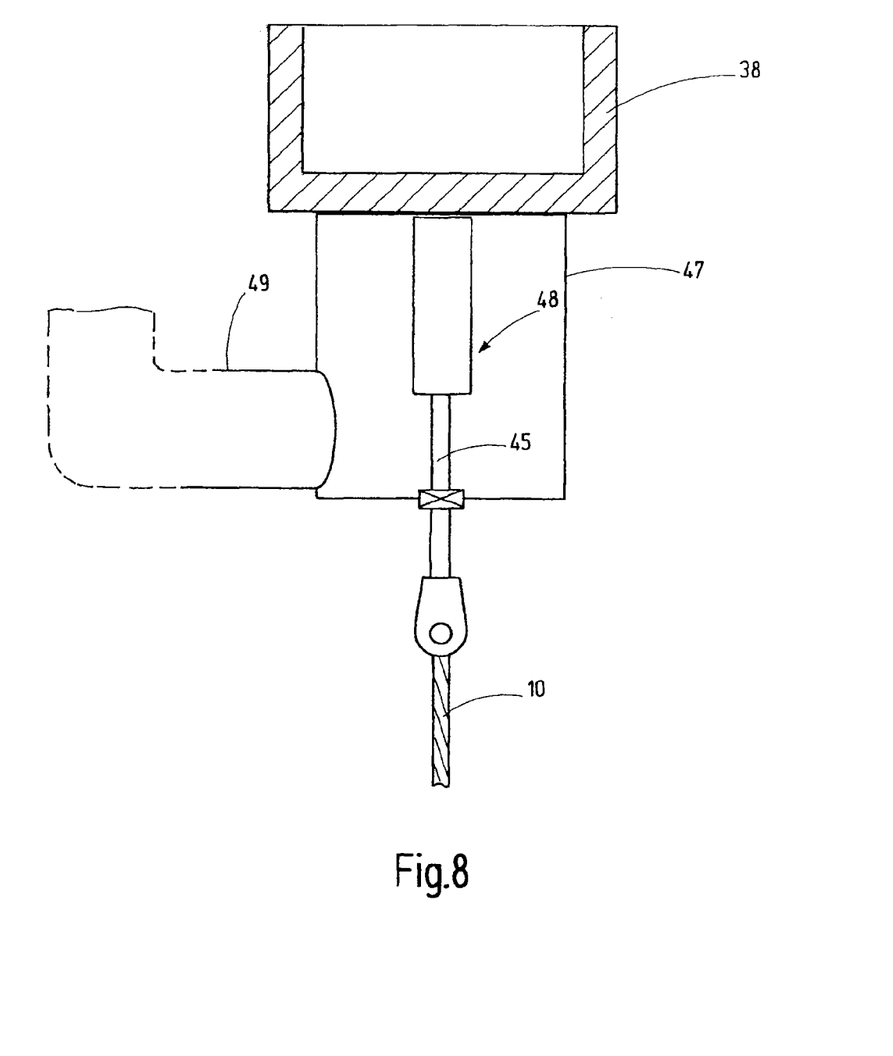
FIG. 8 a schematic representation, in section, of a modified embodiment of the floating body.

Alternatively, the leveling arrangement may also be arranged at another location such as, for example, below part 38, as is shown by FIG. 8. For example, it is possible to provide, e.g., a chamber 47 made of steel, next to or, as illustrated, under part 38 on the cantilever 12, whereby the hydraulic adjustment arrangement 48 is located in said chamber. The bar 45 connected to the cable 10 may extend from said adjustment arrangement. It may be possible for the chamber 47 to be walkable over an appropriately dimensioned pipe 49, the pipe having a diameter of one to two meters and, for example, being connected to the pipe segment 26 or the connecting piece 41.

Figure 10:
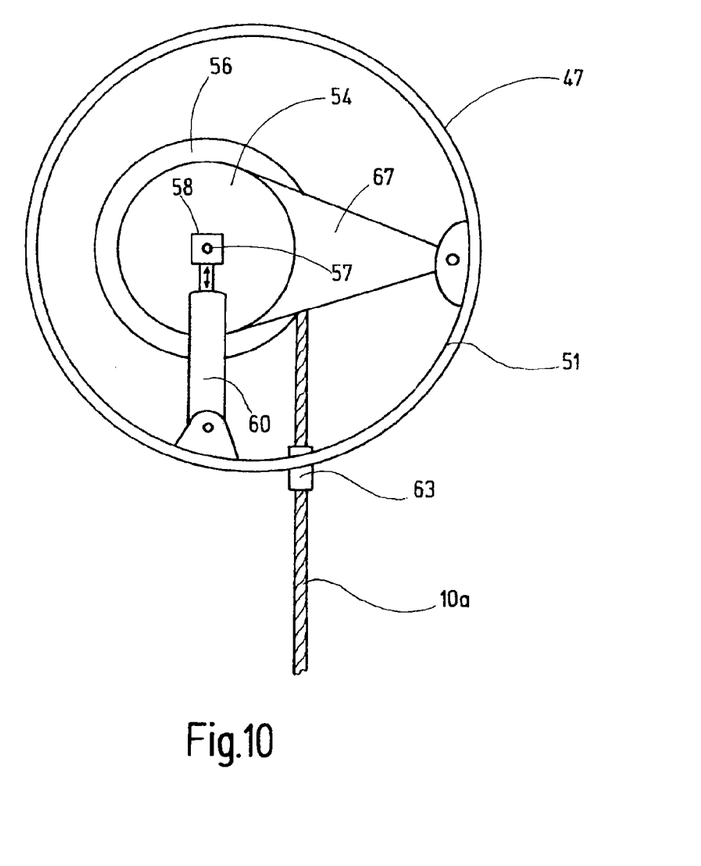
FIG. 10 a schematic representation, diagonally in section, of the machine room in accordance with FIG. 9.

FIGS. 9 and 10 show a preferred embodiment of the foundation supporting framework. The chamber 47 forms a machine room in the form of, e.g., a prone cylinder having rounded end sides. The chamber 47 is arranged under the buoyancy element 29 and connected to the bar framework 35. The wall of the cylinder is stiffened, e.g., with several annular box profile girders 50, 51, 52, 53. The girders are arranged on the inside and/or on the outside, or so as to extend through the wall, on the chamber 47. Inside the chamber 47 is a winch 54 accommodating at least one, preferably two, cable sheaves 55, 56. They may be seated on a common shaft 57 that is rotatably supported in two or move bearing blocks 58, 59. Preferably, the bearing blocks 58, 59 are supported on a vertical-adjustment arrangement, for example in the form of hydraulic cylinders 60, 61 that enable a height adjustment of the bearing blocks 58, 59 and thus an adjustment of the cable sheaves 55,56. Cables 10a, 10b move from the cable sheaves 55, 56 to a common heavy-weight foundation. They may also move to different heavy-weight foundations. At appropriate seals 62, 63, the cables 10a, 10b pass through the wall of the chamber 47. Among each other, the cables 10a, 10b may be connected by a support 64 that ensures a parallel run of the cable sections between the cable sheaves 55, 56 and the support 64.

As indicated only by dashed lines in FIG. 9, the cable sheaves 55, 56 may be separated from the remaining interior space of the chamber 47 by dividing walls 65, 66. Preferably, the entire chamber 47 is dry. Should water penetrate up to the cable sheaves 55, 56, the dividing walls 65, 66 prevent the chamber 47 from being flooded.

A cross-section of the machine room is shown separately in FIG. 10. As is obvious, the winch 54 comprising an electric motor, hydraulic motor or the like as the drive is supported by or attached to the chamber 47 via a torque bracket 67. The torque bracket may be pivotally supported on the wall of the chamber 47. The winch 54 comprises a not specifically shown arrangement for braking and locking the shaft 57 in the desired rotational positions. The hydraulic cylinders 60, 61 are disposed to vertically adjust the bearing blocks 58, 59 in order to enable a vertical fine adjustment of the supporting framework for counterbalancing any forces occurring during operation of the structure. As can be seen, it is also possible to pivotally support the hydraulic cylinders 60, 61—just like the torque bracket 67—on the chamber 47.

Figure 11:
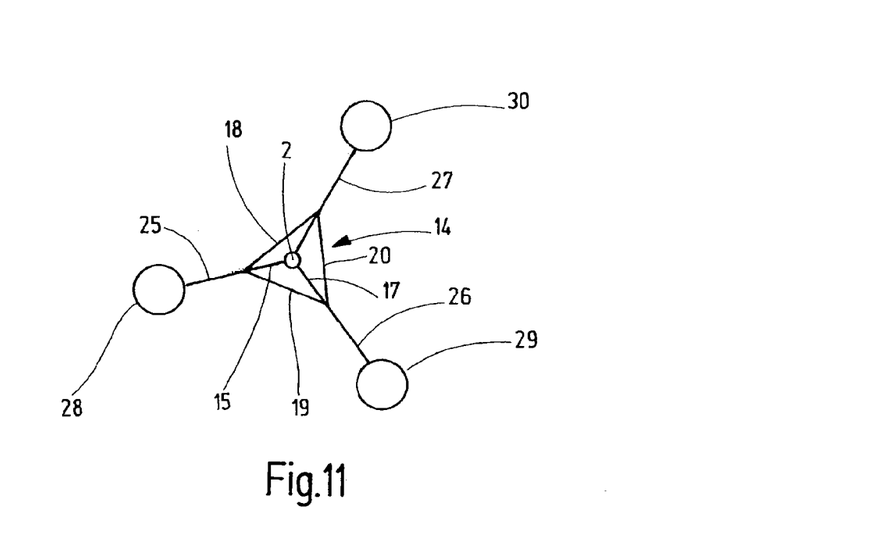
FIGS. 11 and 12 a plan view and a schematic representation, respectively, of various ground plans of the foundation supporting framework.
Figure 12:
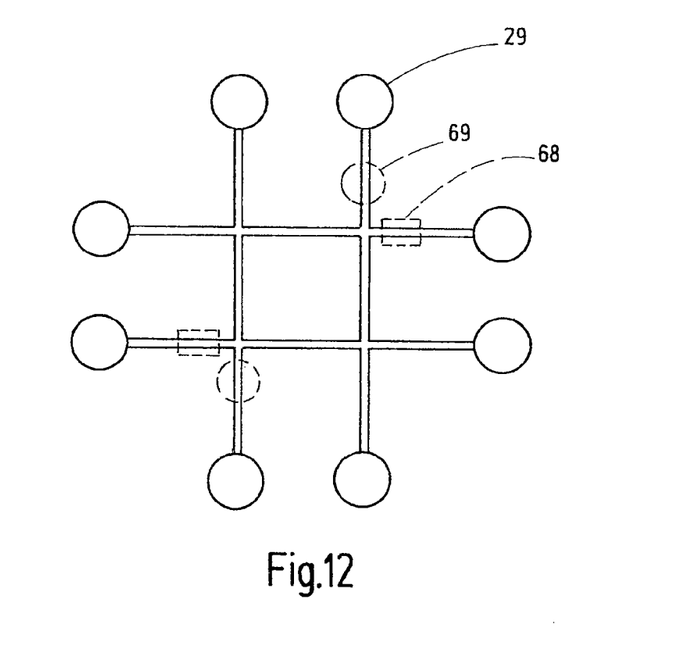

FIG. 11 shows a schematic plan view of the foundation supporting framework. Apart from this three-star form, almost any other forms of the supporting framework are possible, as has been shown in FIG. 12. However, a plurality of ballast elements 68 and/or buoyancy elements 69 may be arranged on the periphery as well as in other sections of the supporting framework. The supporting framework may be constructed of simple components in that prefabricated concrete components are used, in particular, as strut attachment fittings and as buoyancy elements. As is obvious, the foundation supporting framework may be pyramidal and may comprise, for example, an inclined supporting structure formed by three hollow cylinders and comprise a triangular supporting framework base made of three hollow cylinders.

However, the supporting frame base may have any desired and, in particular, also rectangular form, and be, e.g., square. In accordance with one modification of the invention, extending from the lower corner points of the supporting framework base, three cantilevers with a reciprocal opening angle in horizontal projection of 120 degrees may be provided. Apart from that, any desired number of cantilevers with any desired orientation may be used in the ground plan. In particular, the cantilevers may also be positioned so as to form a right angle with respect to each other.

The dimensions of the floating body comprising several buoyancy elements is not a function of the supporting framework components. The design of the supporting framework components is a function of the load distribution pattern. In order to achieve a suitable distribution of mass, it is possible to adapt the system's mass distribution over variably configurable ballast elements, preferably by providing additional mass in the form of prefabricated reinforced concrete parts at suitable locations of the trussed framework structure. The cantilever comprises steel profiles and is attached at the junction points (joints) of the spatial trussed frameworks that connect the horizontal and inclined pipe segments with each other. The spatial trussed frameworks may form cages that circumscribe the junction points (joints). The attachment of the spatial trussed frameworks to the pipe segments is accomplished via a load-distribution (round or rectangular) ring-shaped hollow box girder. In order to achieve the statically required total buoyancy force, it is possible to additionally provide buoyancy components displaying variable design, preferably having the shape of spherical hollow bodies, in the entire region of the trussed structures of the cantilevers.

Preferably, the completely prefabricated foundation supporting structure with the wind power plant set on top in horizontal floating position is taken to its location of use and then connected on-site with the anchoring elements. The winches 54 are used to lower the floating supporting structure, said winches being blocked at a desired immersion depth, e.g., with the use of brakes. A continuous fine adjustment of the floating position may be carried out with the hydraulic cylinders. With the use of the invention, it is possible to achieve a load transfer through diagonal supports preferably having the form of pipe segments of steel and spatial trussed structures of steel, while buoyancy is preferably ensured by buoyancy elements that are located far outside.

Hereinafter is a list of individual features and aspects that may be of importance in conjunction with the invention. The floating foundation supporting framework is intended, in particular, for offshore constructions for positioning functional units in floating position on or in water, in particular on or in the ocean, and is suitable for depths up to 1000 (one thousand) meters. The floating foundation framework comprises several buoyancy elements that are connected to each other by supporting structures, preferably prefabricated steel and concrete structures, and optionally comprises ballast elements, and acts as a foundation or as a platform for a functional unit. By means of pulling elements, the foundation supporting framework is connected to anchoring elements set on the ocean floor in the manner of concrete construction. The horizontal cantilevers support the buoyancy elements and—like the connecting junctions of inclined or horizontal pipe segments—are comprised of load-transferring steel structures, whereby buoyancy-generating hollow elements in the form of prefabricated reinforced concrete components of water-impermeable concrete are arranged in the junction regions. The hollow elements ensure the walkability of the cantilever regions.

The "buoyancy" and "load-transfer" functions are uncoupled from each other at the connecting junctions of the pipe segments in the entire cantilever region and in the connecting region of the buoyancy elements that are located far outside, and are respectively associated with specific supporting foundation elements. Construction includes mixed construction using steel and high-performance concrete. Preferably, the structure is a combination of shell supporting frameworks of materials such as high-performance concrete and/or steel, prefabricated reinforced concrete parts and/or pipe segments and supporting bar frameworks of steel.

The total supporting behavior is characterized by the trussed framework construction in the junctions and in the cantilever region, and the local load introduction of the buoyancy forces in the junctions and in the cantilever region.

The local load introduction of the buoyancy forces occurs in the junctions due to the prefabricated reinforced concrete parts. In the cantilever region, the load introduction may also occur by pipe segments. The buoyancy elements are manufactured, in mixed construction, as prefabricated reinforced concrete parts—preferably as a shell having the form of a circular cylinder with a lower bottom plate and steel shell construction—preferably as a prefabricated shell having the form of a circular cylinder. The interfaces between the concrete construction and the steel construction are formed in the connecting junctions and in the connecting regions of the buoyancy elements. The interfaces are designed as a water-impermeable, corrosion-resistant transition construction, e.g. in the form of a steel construction. A high degree of variability is achieved regarding the inert mass distribution requirements for the total system. It is possible to adapt the system requirements of wind energy plants up to 6 megawatts. Due to the use of system modules, a high level of prefabrication is achieved. Modular assembly systems in semi-fabricated manufacturing condition can be delivered to final assembly. The load introduction of the cable forces takes place from the lower transfer into the trussed framework structure at the end of the cantilever, without stressing the buoyancy element. The manufacture of the system is cost-neutral, independent of the water-depth for depths up to 1000 (one thousand) meters. The system mass distribution can be optimally adapted by ballast elements of variable configuration—preferably by providing additional mass in the form of prefabricated reinforced concrete components—in the entire region of the trussed framework structure of the cantilevers. Optionally, it is possible to adapt the total buoyancy force by additionally providing buoyancy elements of variable configuration, preferably in the form of spherical hollow bodies, at any point of the trussed framework structure of the cantilevers. The planning objective can be illustrated for a 3-megawatt wind power plant. The development of cantilever modifications for plants of up to approximately 5 to 6 megawatts is possible. The anchorage of the foundation system can be implemented by means of anchoring elements to be provided on the ocean floor, preferably by heavy-weight foundations in concrete construction. The heavy-weight foundations can be manufactured on site.

The floating foundation supporting framework according to the invention for offshore structures comprises a plurality of buoyancy elements which are arranged on the outside of a supporting bar framework which, in turn, is connected to ballast elements via cables 8, 9, 10. This design results in a simple construction and low construction costs.

LIST OF REFERENCE NUMERALS 1 wind power plant
2 mast
3 floating foundation
4 foundation supporting framework
5, 6, 7 ballast elements
8, 9, 10, 10a,10b cables
11, 12, 13 cantilevers
14 spatial trussed structure
15, 16, 17, 18, 19, 20 pipe segments
17a box profile
17b socket end
17c,d flanges
21, 22, 23, 24 strut attachment fittings
24a permanent formwork
25, 26 pipe segments
28, 29, 30 buoyancy elements
31 cage
32, 33, 34 box girder
35 bar framework
35a, 35b corbels
35c support
36 upper side
37 bottom
38 lower part of buoyancy element
39 upper part of buoyancy element
40 seal
41 connecting piece
42 connecting arrangement
43, 44 struts
45 bar
46 seal
47 chamber
48 hydraulic adjustment arrangement
49a,b lateral supports
50-53 box profile supports
54 winch
55, 56 cable sheaves
57 shaft
58, 59 bearing blocks
60, 61 hydraulic cylinder
62, 63 seals
64 support
65,66 dividing walls
67 torque bracket
68 ballast element
69 buoyancy element

The invention claimed is:

1. A floating foundation supporting framework (4) for offshore structures, comprising buoyancy elements (28, 29, 30) and a supporting framework (11, 12, 13, 14), wherein the supporting framework (11, 12, 13, 14) comprises a combination of a shell supporting framework and a bar framework, including cantilevers (11, 12, 13), the cantilevers (11, 12, 13) comprise spatial trussed frameworks with rods that extend radially outward from a central spatial trussed structure (14), the buoyancy elements (28, 29, 30) are at least partially made of concrete, and the supporting framework (11, 12, 13, 14) is made of steel, and wherein a hydraulic adjustment arrangement for active leveling of a floating foundation is positioned in the buoyancy elements (28, 29, 30).

2. The floating foundation supporting framework according to claim 1, wherein at least one of the buoyancy elements (28, 29, 30) is a machine room.

3. The floating foundation supporting framework according to claim 1, wherein the buoyancy elements (28, 29, 30) are positioned at outer ends of the cantilevers (11, 12, 13).

4. The floating foundation supporting framework according to claim 1, wherein the supporting framework (11, 12, 13, 14) contains joints (21, 22, 23, 24) made up of reinforced concrete or steel pipes.

5. The floating foundation supporting framework according to claim 4, wherein the joints (21, 22, 23, 24) are hollow elements with enough space to be accessible by persons.

6. The floating foundation supporting framework according to claim 4, wherein at least one of the joints (21, 22, 23, 24) is connected with at least one of the buoyancy elements (28, 29, 30) via a pipe (25, 26, 27) that is large and stable enough to be walked across by persons.

7. The floating foundation supporting framework according to claim 6, wherein the pipe is made of steel, plastic material with or without fiber reinforcement, a steel-plastic composite or reinforced concrete.

8. The floating foundation supporting framework according to claim 1, wherein the supporting framework (11, 12, 13, 14) comprises at least one cage (31) that circumscribes at least one component (21) made of concrete.

9. The floating foundation supporting framework according to claim 1, wherein the buoyancy elements (28, 29, 30)

comprise at least one component (38) made of concrete or reinforced concrete and at least one component (39) made of steel and surround a hollow space.

10. The floating foundation supporting framework according to claim 1, wherein the buoyancy elements (28, 29, 30) are cylinders.

11. The floating foundation supporting framework according to claim 10, wherein the buoyancy elements (28, 29, 30) have flat or conical bottoms.

* * * * *